(12) United States Patent
Enomoto et al.

(10) Patent No.: US 6,896,460 B2
(45) Date of Patent: May 24, 2005

(54) FASTENER

(75) Inventors: Ryo Enomoto, Toyota (JP); Taku Tashima, Toyota (JP); Tadashi Ozeki, Nagoya (JP)

(73) Assignee: Nifco Inc., Yokohama (JP)

( * ) Notice: Subject to any disclaimer, the term of this patent is extended or adjusted under 35 U.S.C. 154(b) by 245 days.

(21) Appl. No.: 10/036,498

(22) Filed: Jan. 7, 2002

(65) Prior Publication Data

US 2002/0094253 A1 Jul. 18, 2002

(30) Foreign Application Priority Data

Jan. 15, 2001 (JP) .......................................... 2001-6904

(51) Int. Cl.$^7$ ................................................ F16B 13/04
(52) U.S. Cl. ............................ 411/41; 411/45; 411/55
(58) Field of Search ............................. 411/41, 45–48, 411/55, 182, 412

(56) References Cited

U.S. PATENT DOCUMENTS

| | | | |
|---|---|---|---|
| 2,926,409 A | * | 3/1960 | Perry ........................... 24/681 |
| 3,319,918 A | | 5/1967 | Rapata |
| 4,233,878 A | | 11/1980 | McGauran et al. |
| 4,259,890 A | * | 4/1981 | Walsh ......................... 411/80.2 |
| 4,342,136 A | | 8/1982 | Okabe et al. |
| 4,760,495 A | * | 7/1988 | Till .............................. 361/804 |
| 5,246,323 A | * | 9/1993 | Vernet et al. ................. 411/29 |
| 6,287,044 B1 | * | 9/2001 | Huber ......................... 403/297 |

FOREIGN PATENT DOCUMENTS

| | | | | |
|---|---|---|---|---|
| AT | | 407286 B | * 12/2000 | ........... F16B/12/12 |
| JP | | 58-60016 | 4/1983 | |
| JP | | 61-37847 | 3/1986 | |

* cited by examiner

*Primary Examiner*—William L. Miller
(74) *Attorney, Agent, or Firm*—Manabu Kanesaka

(57) ABSTRACT

A fastener for connecting plate members includes a male member, and a female member to be inserted into mounting holes of the plate members. The female member includes a cylinder body for receiving the main body therein, a projecting portion formed on an outer periphery of the cylinder body at one end thereof, and protruding portions formed at the other end thereof. A first engaging portion is formed on an outer surface of a main body of the male member or an inner surface of the cylinder body, and a second engaging portion engaging the first engaging portion is formed on the inner surface or the outer surface. The second engaging portion has two engaging sections and a smooth surface portion interposed therebetween. When the male member is inserted into the female member, the male member can be easily engaged with the female member.

4 Claims, 13 Drawing Sheets

Fig. 7(A)
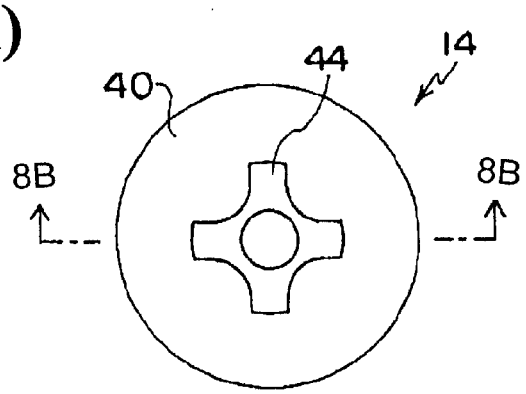
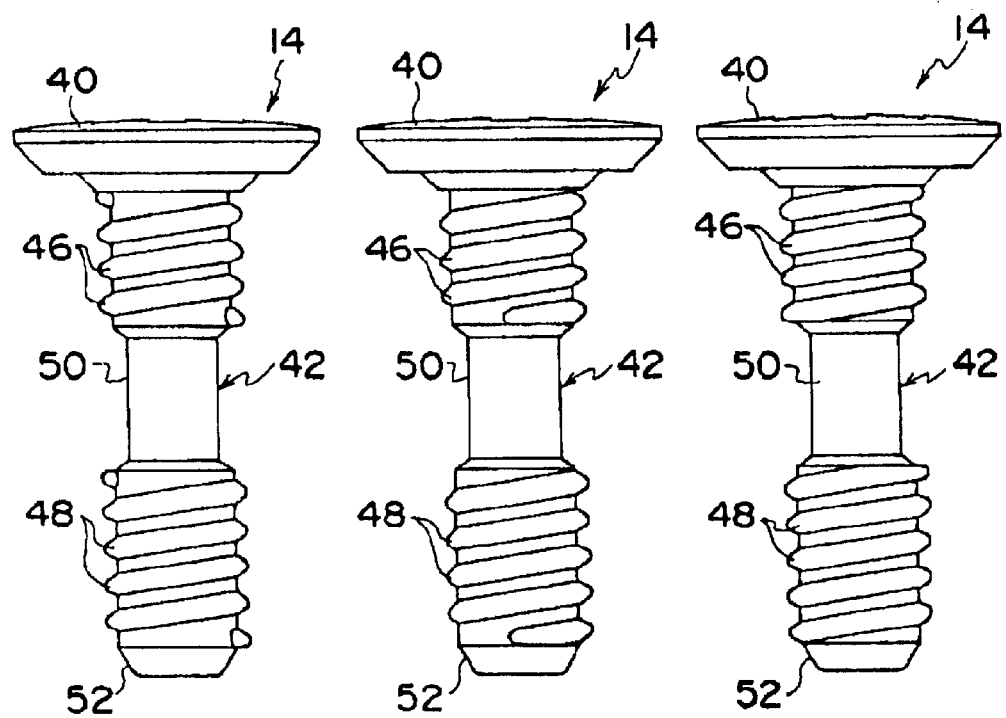
Fig. 7(B)  Fig. 7(C)  Fig. 7(D)
Fig. 7(E)
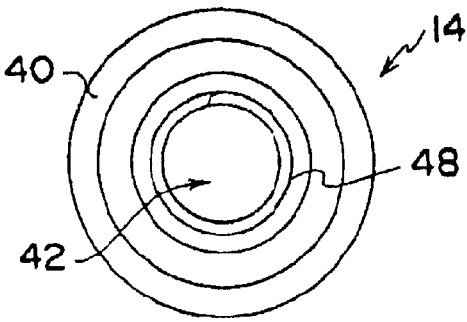

FASTENER

BACKGROUND OF THE INVENTION AND RELATED ART STATEMENT

The present invention relates to a fastener for fixing laminated plate members.

A conventional fastener for fixing laminated plate members is shown in FIG. 12 and FIG. 13, which is disclosed in Japanese Utility Model Publication (KOKOKU) No. S58-60016.

A fastener 100 comprises a grommet 102 and a pin 104, which are formed of a flexible resin. The grommet 102 is inserted into mounting holes 110 and 112 of plate members 106 and 108, which are positioned and laminated, and the pin 104 is inserted into the grommet 102, so that the plate members 106 and 108 are fixed so as not to be separated from each other.

The grommet 102 includes a cylinder member 122 provided with a flange 120, and when the cylinder member 122 is inserted into the mounting holes 110 and 112, the flange 120 abuts against the upper plate member 106 to regulate the position of the grommet 102 in an inserting direction. On an inner peripheral surface of the cylinder member 122, four engagement claws 124 (three engagement claws 124 are shown in the figure) are formed near a mouth of the cylinder member 122 in a peripheral direction at equal intervals therebetween. Below each engagement claw 124 (a distal end side of the inserting direction), there is formed a slit 126 which is cut up to a distal end portion of the cylinder member 122, and accordingly, the distal end side of the cylinder body 122 is divided into four to form four elastic pieces 128 in a cantilever shape. Also, an inner peripheral surface side of each elastic piece 128 constitutes a protruding portion 130 that protrudes inwardly.

The pin 104 includes a pin main body 134 having a flange 132 at a head portion thereof. A male screw 136 is formed in a substantially entire area of a straight portion of an outer peripheral surface of the pin main body 134, and a distal end portion 138 has a tapered shape.

When the pin 104 is inserted into the grommet 102, the male screw 136 engages the claws 124, and receives an insertion load. When the pin 104 is further inserted as it is, the distal end portion 138 of the pin 104 pushes the protruding portions 130, and the elastic pieces 128 are expanded. Thereafter, the pin 104 is inserted until the flange 132 of the pin 104 abuts against a concave portion 140 formed on an upper surface of the flange 120 of the grommet 102, so that the elastic pieces 128 are expanded to the maximum and engaged with the mounting hole 112. This engagement condition is maintained by engagement between the male screw 136 and the engagement claws 124, and accordingly, the plate members 106 and 108 are clamped and fixed by the flange 120 and the elastic pieces 128.

In the conventional fastener 100 described above, however, since the male screw 136 is inserted while being always caught by the engagement claws 124 as the pin 104 is inserted into the grommet 102, a heavy insertion load is generated and maintained through the whole insertion process. This continuous insertion load causes poor workability and an additional burden to an operator.

The present invention has been made in view of the foregoing, and an object of the invention is to provide a fastener in which an insertion load is reduced and workability is improved.

Further objects and advantages of the invention will be apparent from the following description of the invention.

SUMMARY OF THE INVENTION

To achieve the aforementioned object, the first aspect of the present invention provides a fastener inserted into mounting holes formed in plate members for fixing the plate members in a laminated state. The fastener is formed of a female member, and a male member. The female member has a cylinder body to be inserted into the mounting holes, a projecting portion, an engaging portion, and a protruding portion. In the female member, the projecting portion is provided on an outer peripheral surface of the cylinder body at one end, and has a larger diameter than the mounting holes. The engaging portion is provided on an inner peripheral surface of the cylinder body, and at the other end of the cylinder body, the protruding portion is provided along the inner peripheral surface at a position closer to a distal end side in an inserting direction than the engaging portion. The other end of the cylinder body with the protruding portion can be expanded and engaged with the mounting holes. The male member has a male member main body with two ends, a projecting portion having a diameter larger than that of the male member main body and provided at one end thereof, a first male screw formed on an outer peripheral surface of the male member main body, and a second male screw formed on the outer peripheral surface of the male member main body at a predetermined interval spaced from the first male screw. The second male screw is located at a position closer to the other end of the male member main body than the first male screw. The male member main body presses the protruding portion outwardly when the male member main body is inserted into the cylinder body of the female member more than a predetermined depth.

In the fastener according to the first aspect of the invention, when the main body of the male member is inserted into the cylinder body of the female member, the second male screw formed on the outer peripheral surface of the main engages the engaging portion formed on the inner peripheral surface of the cylinder body. Accordingly, the male member is held by the female member to be temporarily assembled. Also, in this temporarily assembled condition, since the main body of the male member does not press the protruding portion formed on the inner peripheral surface of the female member, the expanding portion of the female member is not expanded.

When the female member in this temporarily assembled condition is inserted into the mounting holes of the plate members, the projecting portion formed on the outer peripheral surface of the cylinder body abuts against one of the plate members. Thus, the position of the female member in the inserting direction is set. When the male member is further inserted into the female member, an insertion load is created due to an engagement of the second male screw with the engaging portion. This load is maintained until the second male screw is disengaged from the engaging portion. When the second male screw is disengaged from the engaging portion, the insertion load is released. From this point, the male member again can be easily inserted into the female member until the first male screw reaches the engaging portion. When the first male screw reaches the engaging portion, the insertion load is created again.

Once the male member reaches the predetermined depth at the end of or during the insertion with a low load, the main body of the male member starts to press the protruding portion outwardly to expand the end of the female member.

Also, this engaging condition is maintained by the engagement between the first male screw and the engaging portion. Therefore, the laminated plate members are clamped and fixed by the projecting portion of the female member.

Accordingly, when the male member is inserted into the female member in the operation of fixing the plate members, since there is a period when an insertion load is released, the workability is improved, and burden to an operator is reduced.

According to the second aspect of the invention, a fastener may be formed of a male member having a male member main body; and a female member having a cylinder body, a projecting portion, a first female screw, a second female screw, and a protruding portion. In the male member, the male member main body is provided with an engaging portion on an outer peripheral surface thereof. In the female member, the cylinder body is designed to be inserted into the mounting holes and to receive the male member main body therein. The projecting portion is provided on an outer peripheral surface of one end of the cylinder body and has a diameter larger than those of the mounting holes. The first female screw is formed on an inner peripheral surface of the cylinder body, and capable of engaging the engaging portion of the male member main body inserted therein. The second female screw is formed on the inner peripheral surface of the cylinder body at a predetermined interval spaced from the first female screw, and is located at a position closer to a distal end side in an inserting direction of the male member main body than the first female screw. The second female screw engages the engaging portion when the male member main body is inserted into the female member more than a predetermined depth. The protruding portion is formed on the inner peripheral surface of the cylinder body at a position closer to the distal end side in the inserting direction of the male member main body than the second female screw, and the protruding portion is pressed outwardly by the male member main body when the male member main body is inserted more than the predetermined depth. The distal end of the female member is expanded and engaged with the mounting holes when the protruding portion is pressed outwardly.

In the fastener according to the second aspect of the invention, when the main body of the male member is inserted into the cylinder body of the female member, the engaging portion formed on the outer peripheral surface of the main body of the male member engages the first female screw formed on the inner peripheral surface of the cylinder body. Accordingly, the male member is held by the female member to be temporarily assembled. Also, in this temporarily assembled condition, since the main body of the male member does not press the protruding portion formed on the inner peripheral surface of the female member, the distal end of the female member is not expanded.

When the temporarily assembled female member is inserted into the mounting holes of the plate members, the projecting portion formed on the outer peripheral surface of the cylinder body abuts against the plate member. Thus, the position of the female member in the inserting direction is set. When the male member is inserted into the female member, an insertion load is caused by the engagement between the first female screw and the engaging portion. The insertion load is maintained until the first female screw is disengaged from the engaging portion. When the first female screw is disengaged from the engaging portion, the insertion load is released until the engaging portion reaches the second female screw. After the engaging portion reaches the second female member, the insertion load occurs again.

Once the male member reaches a predetermined depth at the end of or during the insertion with a low load, the main body of the male member presses the protruding portion outwardly to expand the expanding portion of the female member. Accordingly, in the female member, the expanded distal end engages the mounting holes, and the engagement condition is maintained by the engagement between the engaging portion and the second female screw. As a result, the laminated plate members are clamped and fixed by the projecting portion of the female member.

As described above, even in the structure in which the engaging portion is formed on the outer peripheral surface of the main body of the male member and the two female screws disposed at a predetermined interval are formed on the cylinder of the female member, the insertion load can be released when inserting the male member into the female member, resulting in an improvement in workability.

BRIEF DESCRIPTION OF THE DRAWINGS

FIGS. 3(A) and 3(B) are views showing the grommet in FIG. 2, wherein FIG. 3(A) is a top plan view thereof, and FIG. 3(B) is a front view thereof;

FIGS. 4(A) and 4(B) are views showing the grommet in FIG. 2, wherein FIG. 4(A) is a rear view thereof, and FIG. 4(B) is a bottom plan view thereof;

FIGS. 5(A) and 5(B) are views showing the grommet in FIG. 2, wherein FIG. 5(A) is a cross sectional view taken along line 5A—5A in FIG. 3(A), and FIG. 5(B) is a cross sectional view taken along line 5B—5B in FIG. 3(A);

FIGS. 7(A) to 7(E) are views showing the pin in FIG. 6, wherein FIG. 7(A) is a top plan view thereof; FIG. 7(B) is a left side view thereof; FIG. 7(C) is a front view thereof; FIG. 7(D) is a right side view thereof; and FIG. 7(E) is a bottom plan view thereof;

FIGS. 8(A) and 8(B) are views showing the pin in FIG. 6, wherein FIG. 8(A) is a rear view thereof, and FIG. 8(B) is a cross sectional view taken along line 8B—8B in FIG. 7(A);

DETAILED DESCRIPTION OF THE PREFERRED EMBODIMENTS

Hereunder, embodiments of the invention will be explained with reference to the accompanied drawings.

Figure 1:
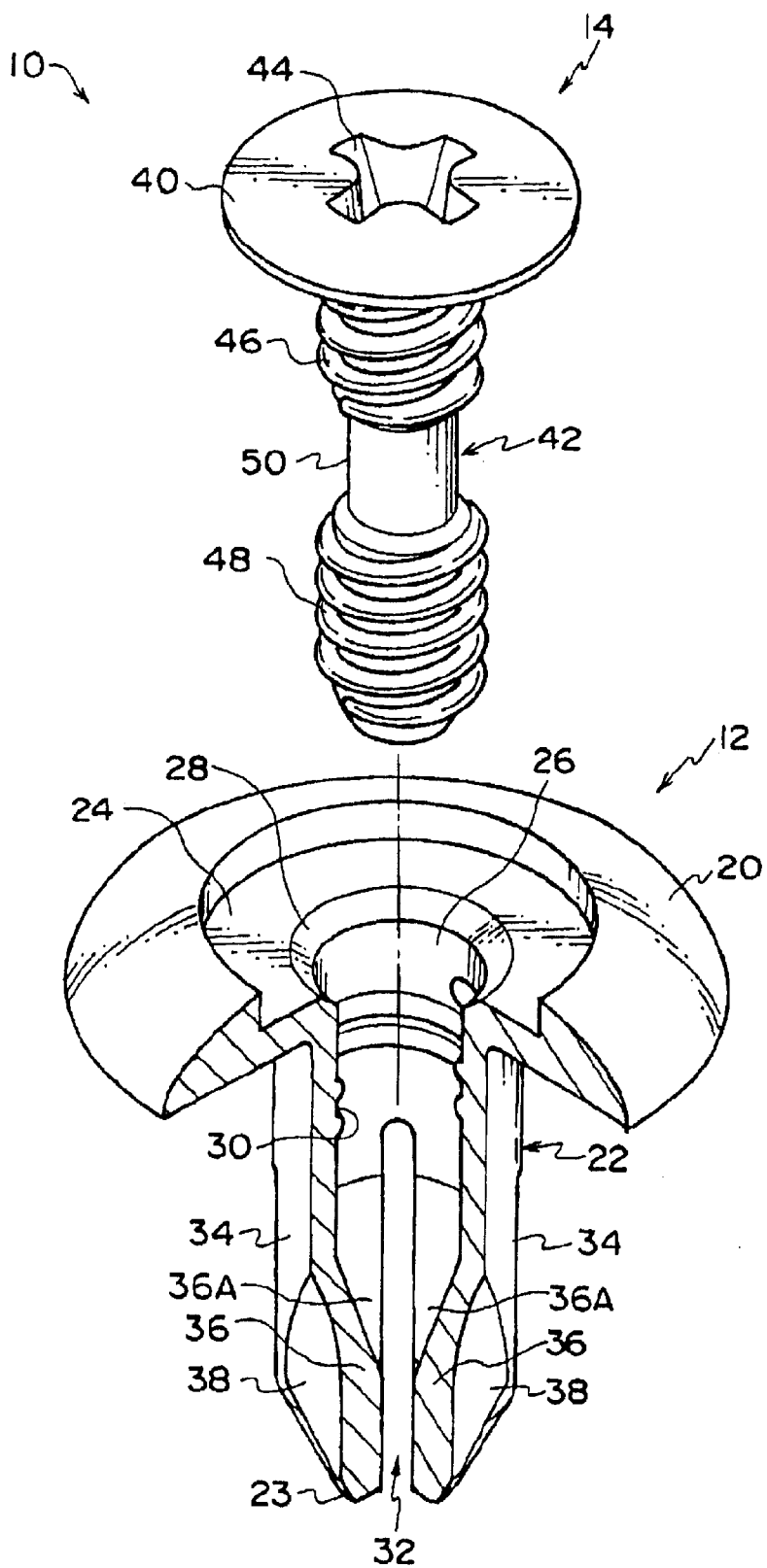
FIG. 1 is an exploded perspective view of a fastener according to an embodiment of the invention in a condition that a grommet and pin are separated.
Figure 2:
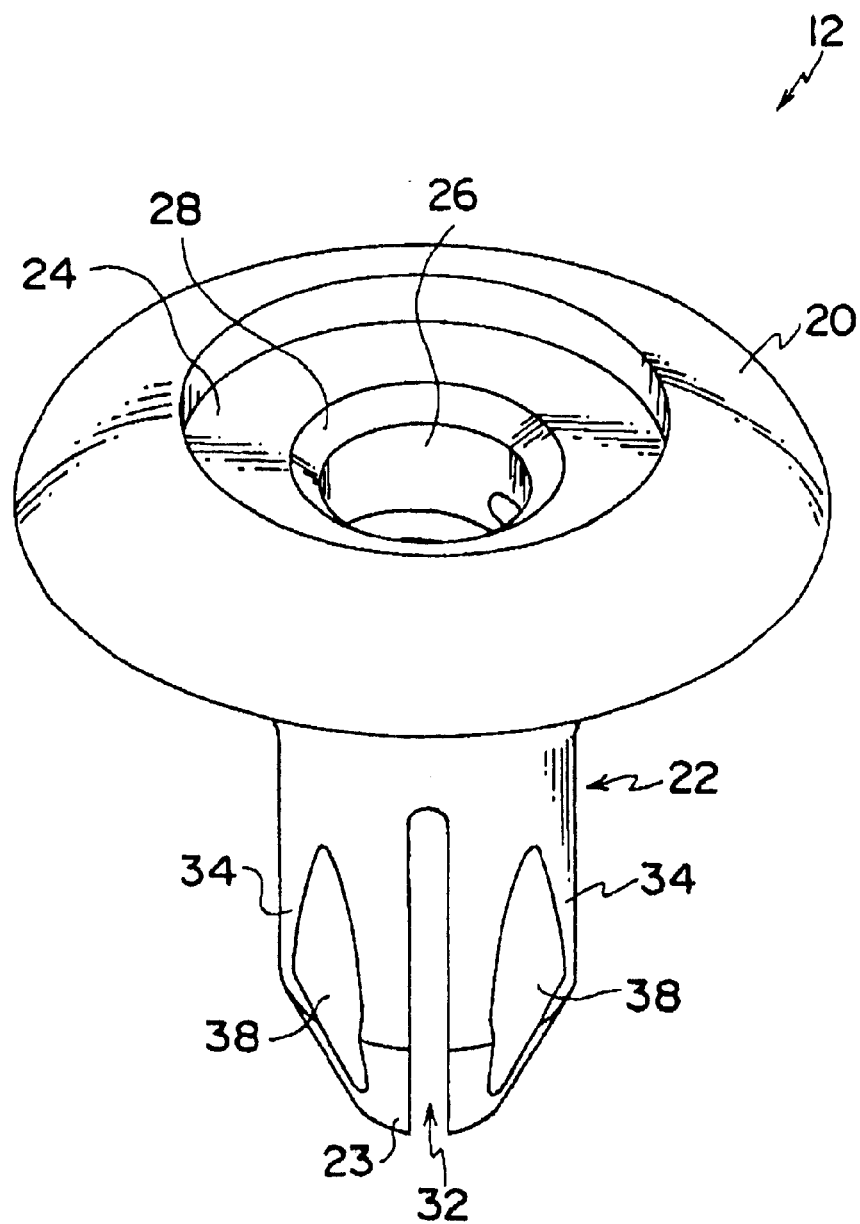
FIG. 2 is a perspective view of a grommet according to an embodiment of the invention.
Figure 3A:
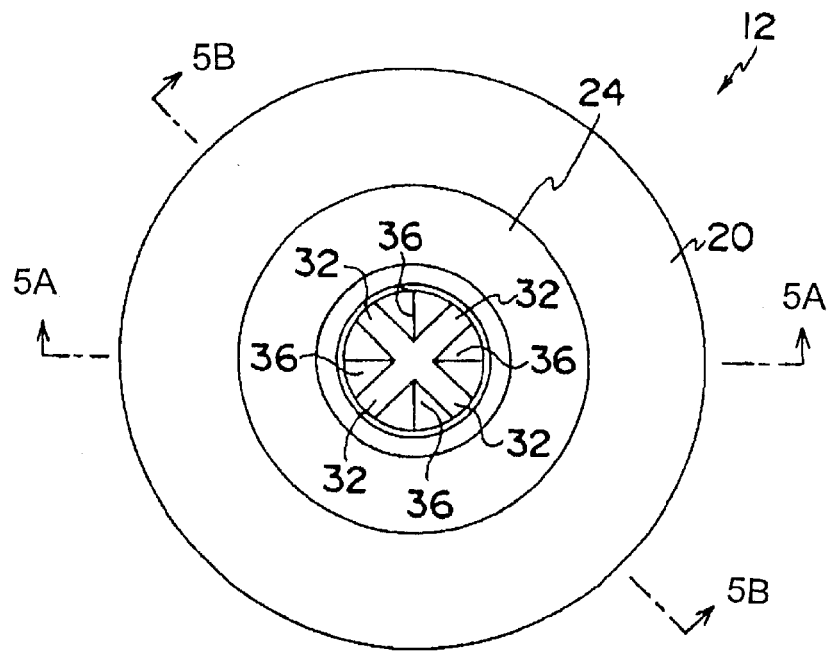
Figure 3B:
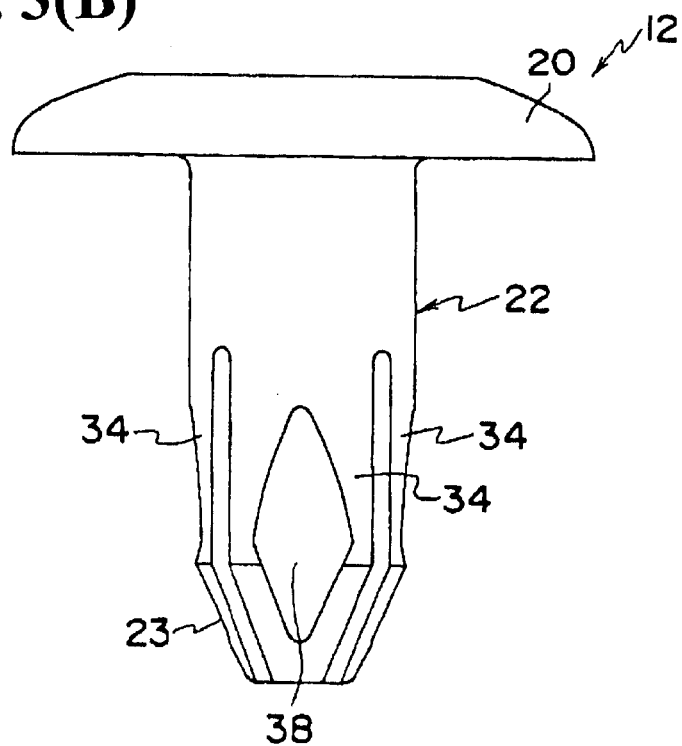
Figure 4A:
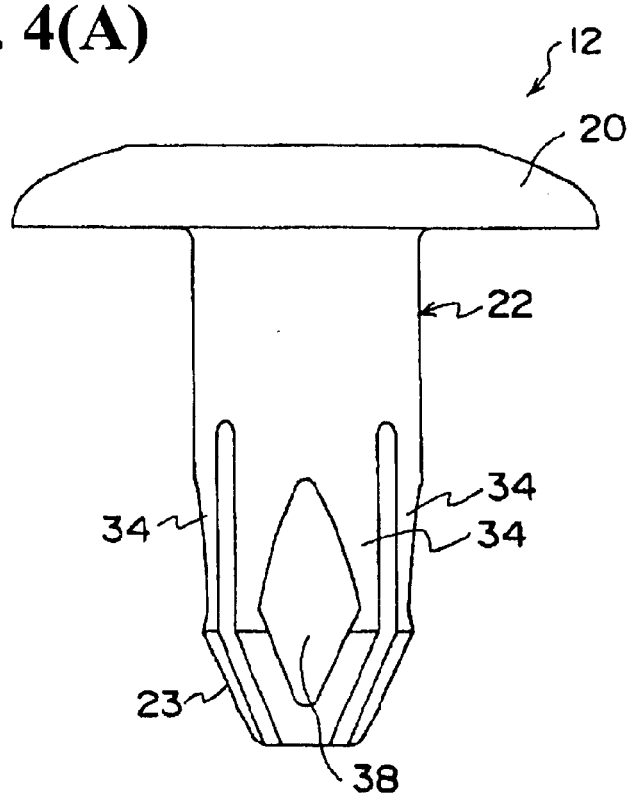
Figure 4B:
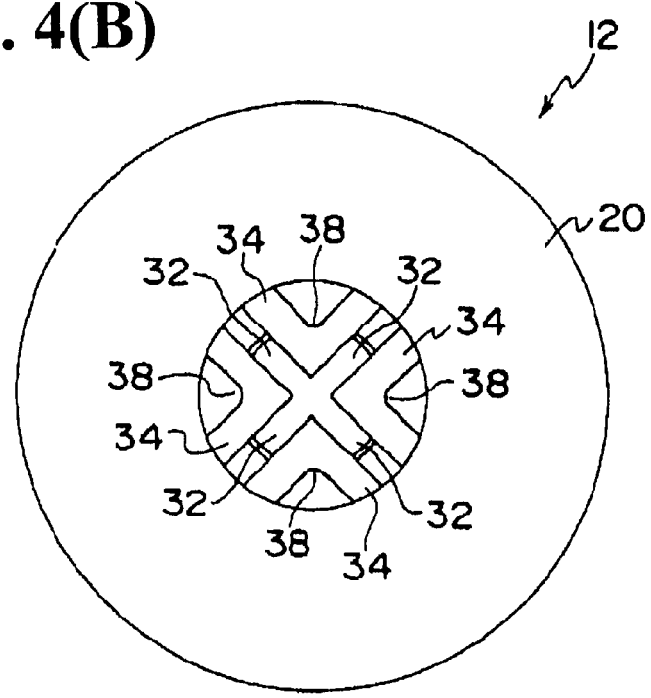
Figure 5A:
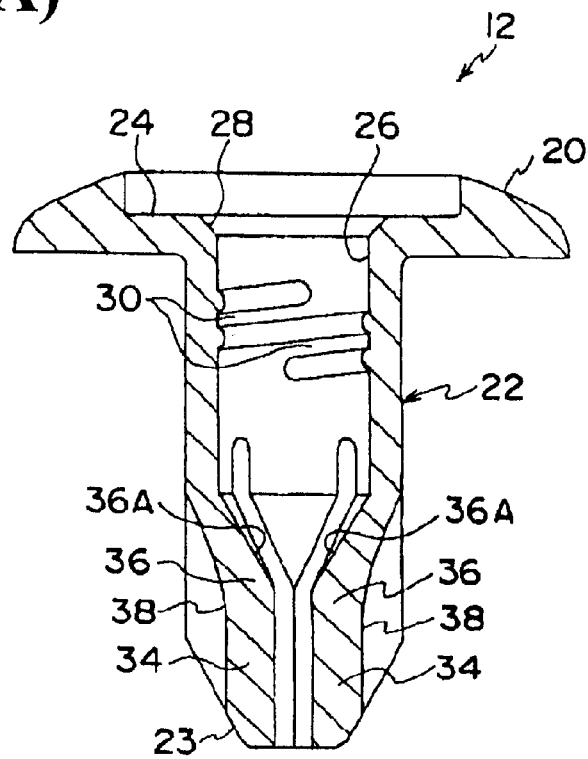
Figure 5B:
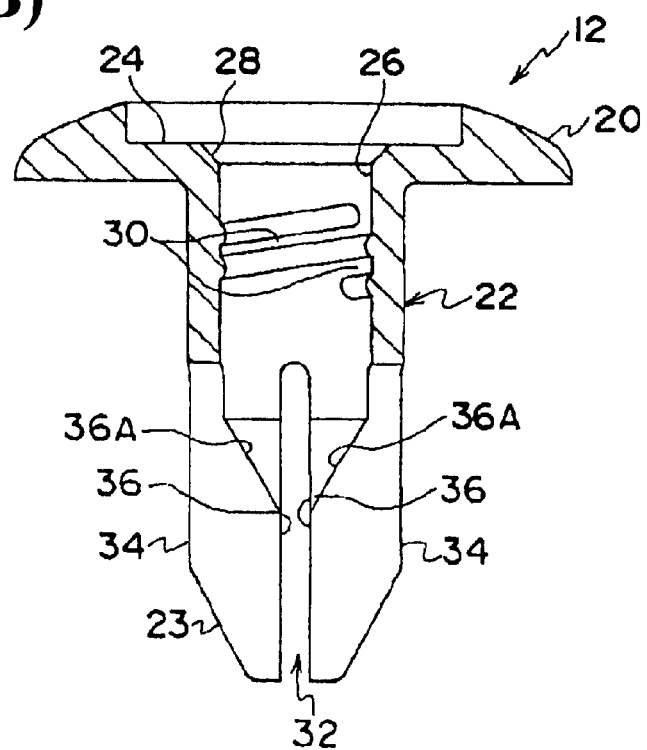
Figure 6:
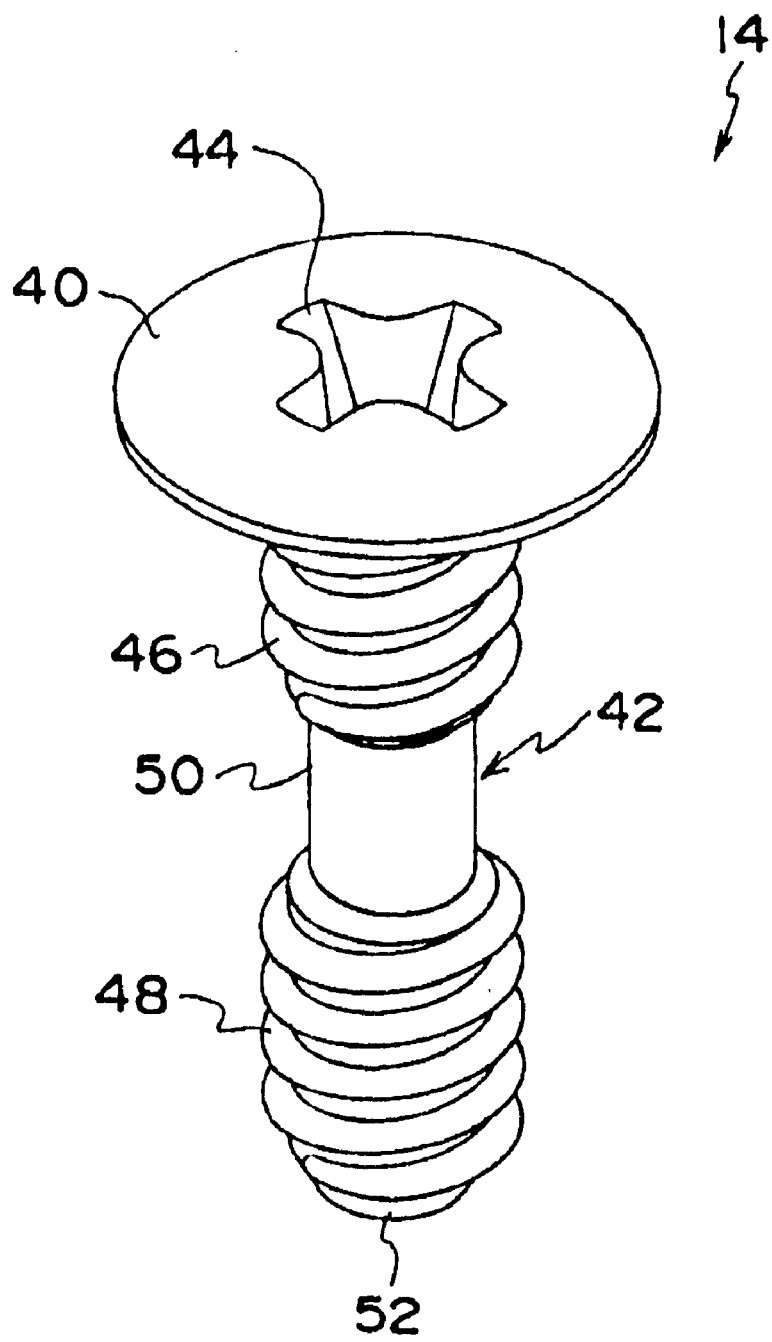
FIG. 6 is a perspective view of a pin according to an embodiment of the invention.
Figure 8A:
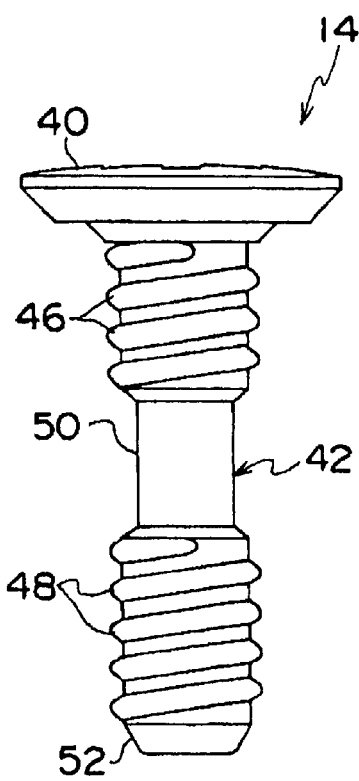
Figure 8B:
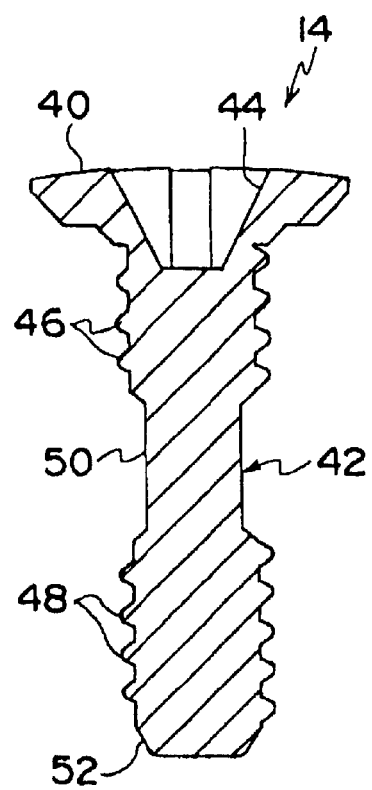

FIG. 1 shows an exploded perspective view of a fastener (fastening device) according to an embodiment of the invention, and a fastener 10 is formed of a grommet 12 and a pin 14, which are formed by a flexible resin. FIG. 2 to FIG. 5(B) shows the grommet 12, and FIG. 6 to FIG. 8(B) shows the pin 14.

Firstly, the grommet 12 will be explained. The grommet 12 includes a cylinder body 22 that is provided with a circular flange 20 at an upper end portion of an outer peripheral surface thereof. The flange 20 has a substantially tapered shape, in which an end portion side of an upper surface is gently sloped downwardly, and a circular concave portion 24 having a diameter larger than that of the cylinder body 22 is formed at a center of the upper surface of the flange 20.

The cylinder body 22 has a tapered shape in which a diameter of an outer peripheral surface of a distal end portion 23 is reduced toward the distal end side, so as to be easily inserted into mounting holes of plate members. Also, the cylinder body 22 is provided with an insertion hole 26 into which the pin 14 is inserted, and a tapered portion 28 that constitutes an inclined surface having a diameter reduced toward an insertion direction is formed at a mouth of the insertion hole 26. The tapered portion 28 can easily guide the pin 14 into the insertion hole 26.

A female screw 30 is formed on an inner peripheral surface of the insertion hole 26 at a position slightly deeper than the mouth. The female screw 30 has round screw threads, in which apexes of sections of respective screw threads are substantially circular arc forms, and is provided with two threads (two leads). An insertion direction distal end side of the female screw 30 is provided with four slits 32, which are formed by cutting the cylinder wall of the cylinder body 22 up to the distal end portion and disposed in a circumferential direction at intervals of 90 degrees. The slits 32 divide the distal end side of the cylinder body 22 into four cantilever-like elastic pieces 34.

An inner peripheral surface of each elastic piece 34 is provided with a protruding portion 36, which has an upper portion constituting a tapered surface 36A having a diameter decreased toward the distal end side and is protruded inwardly, and an outer peripheral surface of each elastic piece 34 is provided with a concave or groove 38. The concave 38 makes a wall thickness of the elastic piece 34 substantially constant, and prevents sink upon molding. The elastic piece 34 bends elastically to be expanded when the protruding portion 36 is pressed outwardly.

The pin 14 includes a pin main body 42 provided with a circular flange 40 formed at a head thereof. The flange 40 has a diameter slightly smaller than that of the circular concave portion 24 of the grommet 12, and has an upper surface gently curved to constitute a substantially spherical surface. A cross recess or Phillips screw slot 44 is formed at a central portion of the upper surface of the flange 40.

In the pin main body 42, a male screw 46 is formed below the flange 40 on an outer peripheral surface thereof, and a male screw 48 is formed at a side closer to the distal end side than the male screw 46 by having a predetermined interval between the male screw 46 and the male screw 48. The male screw 46 and the male screw 48 have round screw threads, in which apexes of sections of the respective screw threads are substantially circular arc forms. An outside diameter and a root diameter of the screws are made uniformly, and the pitch and the lead angle are made in accordance with those of the female screw 30 of the grommet 12.

Further, a portion between the male screw 46 and the male screw 48 constitutes a cylindrical smooth portion 50 having a diameter smaller than a diameter at roots of these screws, and a distal end portion 52 of the pin main body 42 has a tapered form.

Figure 9:
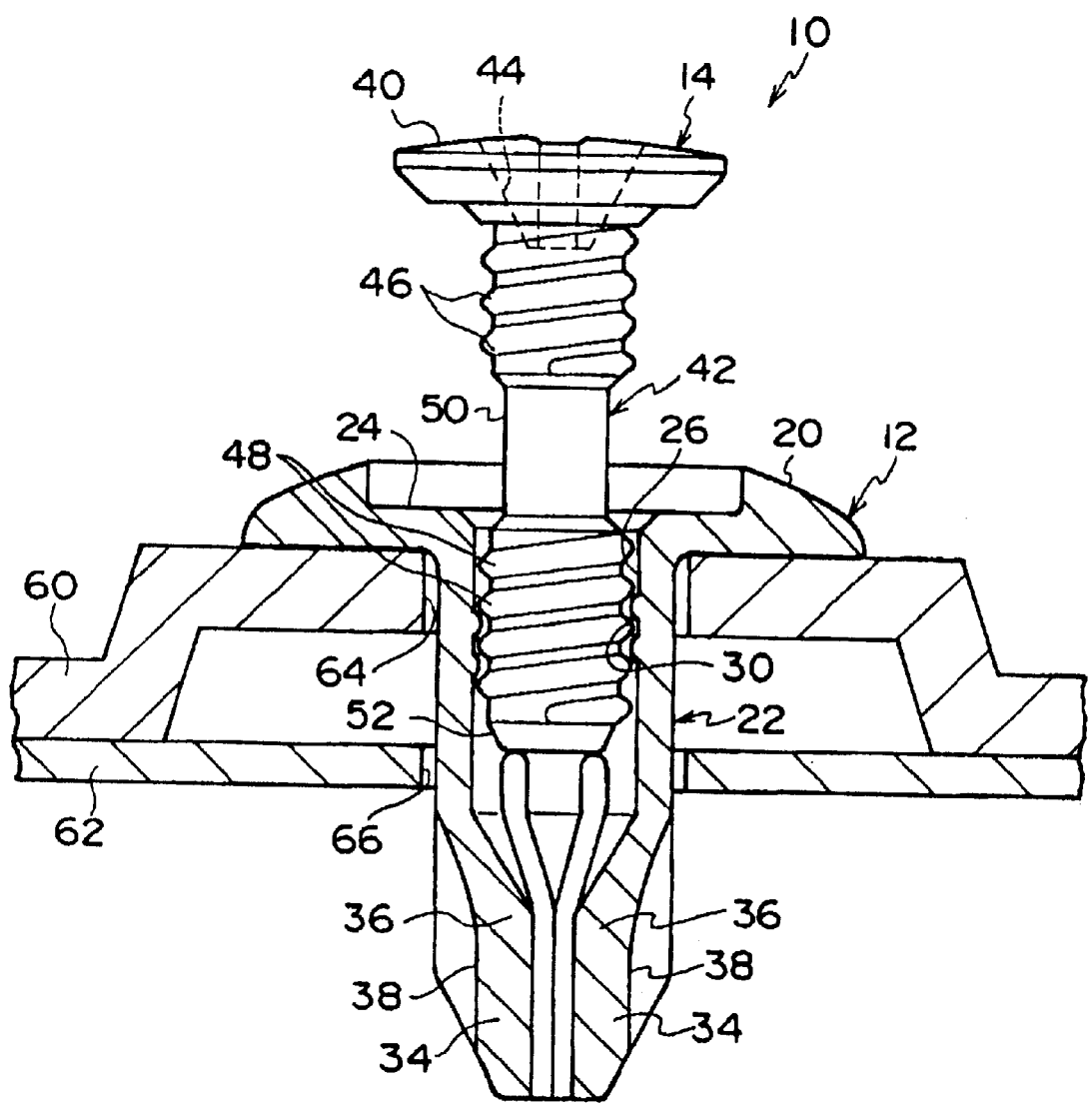
FIG. 9 is a partly sectional view for explaining steps of fixing a louver to a panel by a fastener according to an embodiment of the invention, in which a temporarily assembled fastener is inserted into mounting holes.
Figure 10:
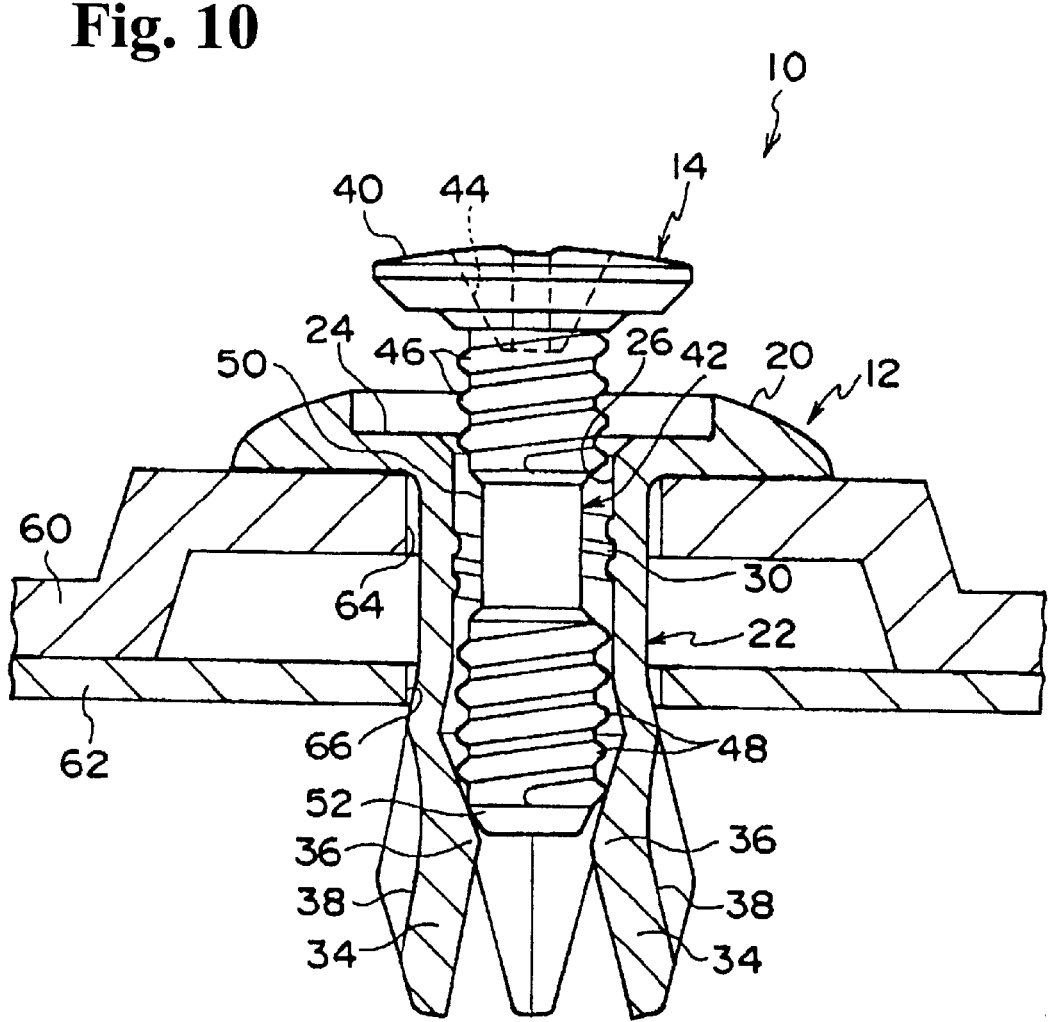
FIG. 10 is a partly sectional view for explaining steps of fixing a louver to a panel by the fastener according to the embodiment of the invention, in which the pin is partly inserted into the grommet.
Figure 11:
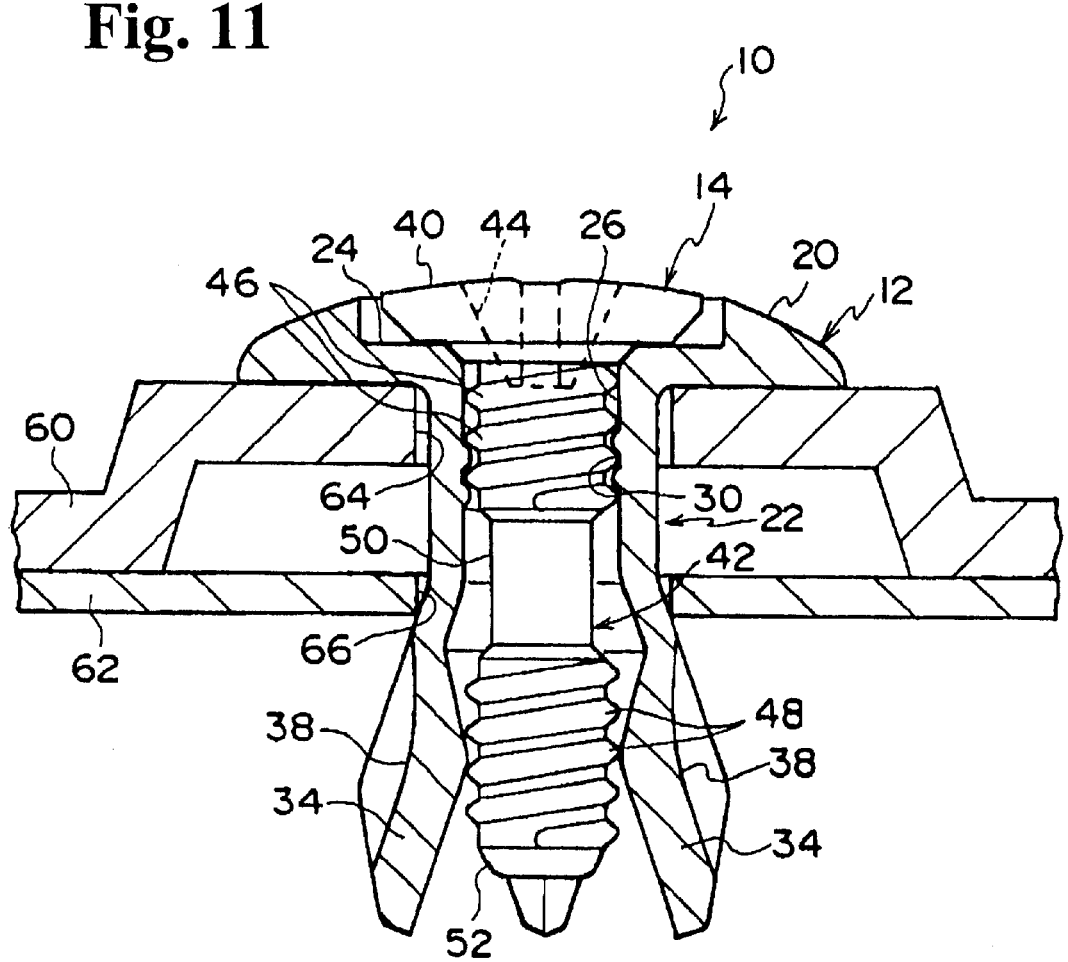
FIG. 11 is a partly sectional view for explaining steps of fixing the louver to the panel by the fastener according to the embodiment of the invention, in which the pin is completely inserted into the grommet to fix the louver to the panel.
Figure 12:
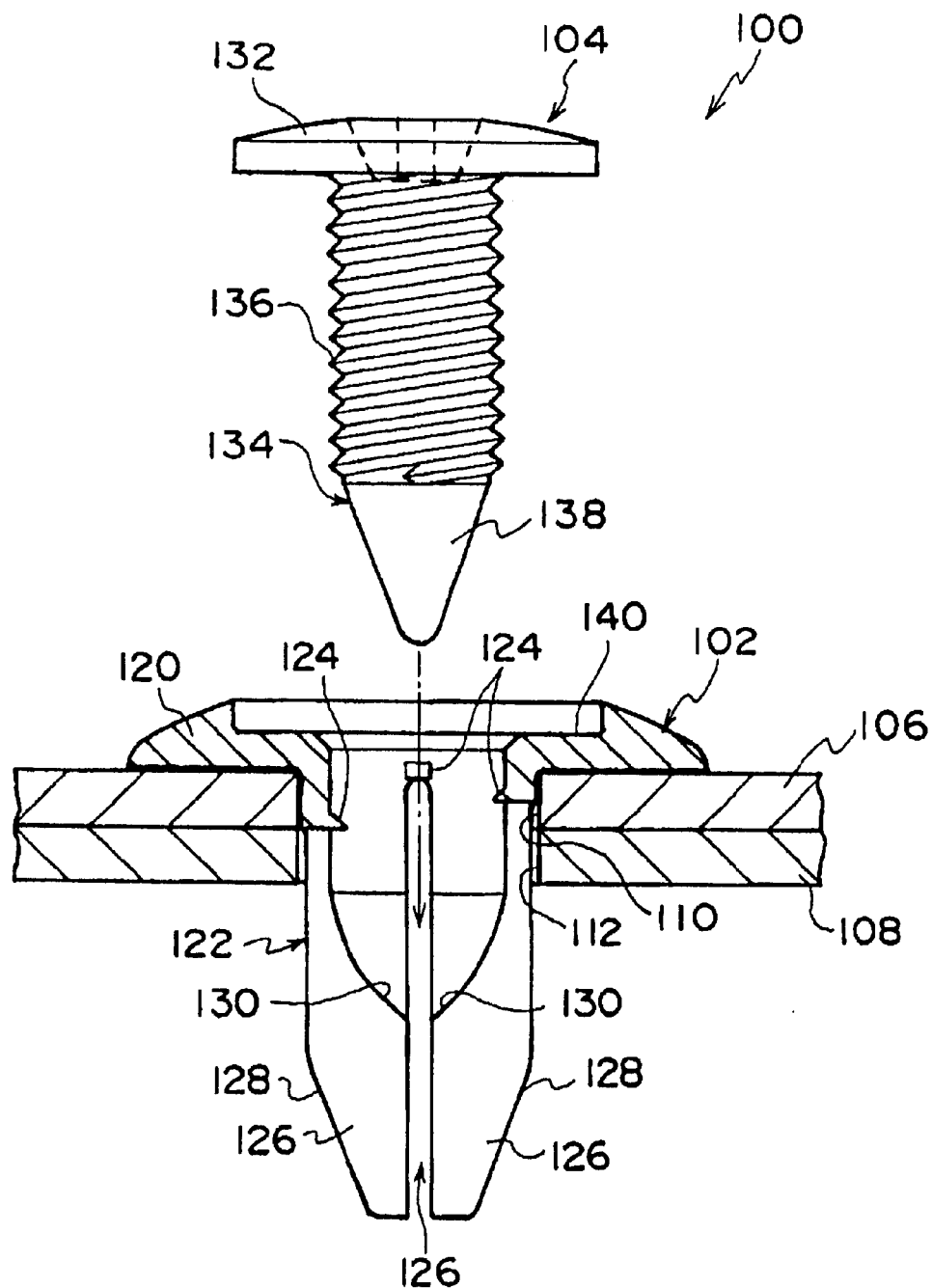
FIG. 12 is a partly sectional view for explaining steps of fixing plate members by a conventional fastener, in which a grommet is inserted into mounting holes.
Figure 13:
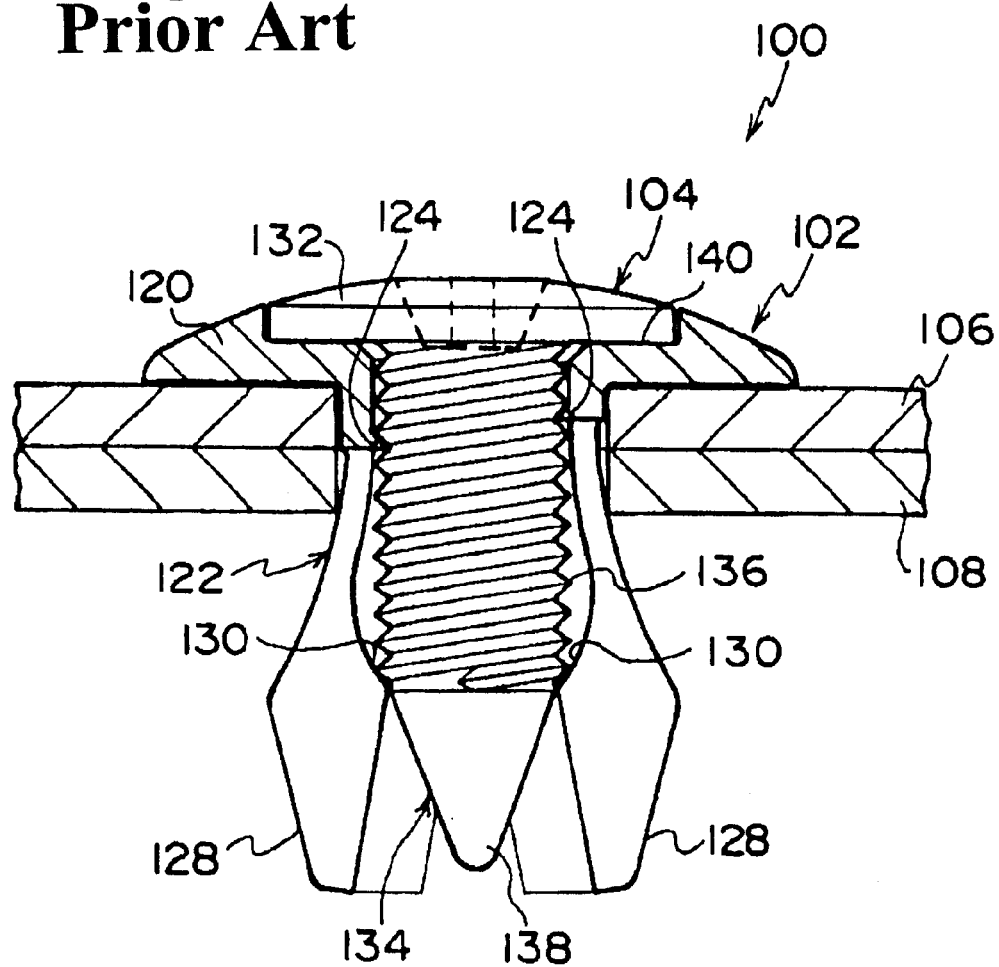
FIG. 13 is a partly sectional view for explaining steps of fixing plate members by a conventional fastener, in which the pin is completely inserted into the grommet to fix the plate members.

Next, operations of the embodiment of the invention will be explained. FIG. 9 to FIG. 11 shows steps of fixing a louver to a panel by the fastener 10.

Firstly, before the fastener 10 is assembled with the louver and the panel, the pin 14 is inserted into the grommet 12 to assemble the fastener 10 temporarily. In this case, as shown in FIG. 9, the pin 14 is inserted into the grommet 12 in such a degree that the male screw 48 formed at the distal end side of the pin main body 42 is inserted inside the insertion hole 26 of the cylinder body 22. Accordingly, the male screw 48 of the pin main body 42 engages the female screw 30, and the pin 14 is held by the grommet 12 temporarily.

Secondly, the grommet 12 of the temporarily assembled fastener 10 is inserted into the mounting holes 64 and 66 of the louver 60 and the panel 62, which are positioned and laminated. Here, a position of the fastener 10 in the inserting direction is regulated by the flange 20 of the grommet 12 that abuts against the upper surface of the louver 60.

When the pin 14 is inserted into the grommet 12, an insertion load is created. When the male screw 48 is disengaged from the female screw 30, the cylindrical portion 50 is positioned at the female screw 30 to release the insertion load, so that the pin 14 can be inserted further with less insertion load.

While passing through the cylindrical portion 50, the distal end portion 52 of the pin main body 42 and the female screw 48 reach the protruding portions 36 of the cylinder body 22. When the pin 14 is further inserted from this position, the elastic pieces 34, in which the protruding portions 36 are pressed by the distal end portion 52 and the male screw 48, are gradually expanded as shown in FIG. 10. Incidentally, in the condition that the elastic pieces 34 have just started expanding, since the force necessary for bending the elastic pieces 34 is small, the insertion load of the pin 14 does not increase greatly.

As the pin 14 is further inserted, the male screw 46 reaches the female screw 30 to engage therewith, so that the insertion load appears again. Then, the pin 14 is inserted until the flange 40 of the pin 14 abuts against the circular concave portion 24 of the grommet 12, the flange 40 is accommodated in the circular concave portion 24, and the elastic pieces 34 are expanded at the maximum to engage the mounting hole 66. This engaging condition is maintained by the engagement between the male screw 46 and the female screw 30. Therefore, the louver 60 and the panel 62, which are laminated, are clamped and fixed by the flange 20 of the grommet 12.

Also, in the case of removing the fastener 10, a Phillips type screw driver is inserted into the cross recess 44 of the pin 14 to turn the pin 14 in a predetermined direction, so that the pin 14 is removed from the grommet 12. Accordingly, the elastic pieces 34 of the grommet 12 return to the original state, and the grommet 12 in which the engagement condition is released can be pulled out from the mounting holes 64 and 66.

Incidentally, although the fastener 10 is inserted into the mounting holes 64 and 66 after the fastener 10 is temporarily assembled in the steps described above, the grommet 12 is inserted into the mounting holes 64 and 66 in advance, and then the pin 14 can be inserted into the grommet 12.

As described above, in the fastener 10 according to the embodiment of the invention, when the pin 14 is inserted into the grommet 12 to fix the louver 60 to the panel 62, there is a period that the insertion load is released. Therefore, the workability is improved as compared with the conventional fastener, and burden to an operator is reduced.

Incidentally, although the one female screw 30 is formed in the grommet 12 side and the two male screws 46 and 48 disposed at the predetermined interval are formed in the pin 14 side in the aforementioned embodiment, the number of the female screw and the number of the male screws can be switched. Namely, the same object can be achieved in a structure that one male screw is provided in the pin side and two female screws disposed at the predetermined interval are formed in the grommet side.

Also, the female screw 30 formed in the grommet 12 side can be any form as long as it can engage the male screws 46 and 48 and can be detached by turning the pin 14 at the time of disassembling. The female screw 30 can be, for example, claws or projections. Also, the same thing can be applied in the case that the number of the female screw and the number of the male screws are switched, and in this case, a male screw in the pin side can be replaced by claws or the like.

Also, the shape of the flange 20 formed in the grommet 12 side is not limited to the one in the embodiment, and it can be a rectangular shape or the like as long as the flange 20 can regulate the position of the grommet 12 inserted into the mounting holes 64 and 66. Further, the flange 20 can be a projected portion other than the flange.

Also, the numbers and the shapes of the elastic pieces 34 and the protruding portions 36 formed in the grommet side 12 are not limited to those in the embodiment, and can be adequately modified in accordance with shapes and depths of the mounting holes.

Since the fastener of the invention has the structure as described above, the insertion load is lowered, and assembling workability is improved.

While the invention has been explained with reference to the specific embodiments of the invention, the explanation is illustrative and the invention is limited only by the appended claims.

What is claimed is:

1. A fastener for connecting plate members with mounting holes, comprising:

a male member having a main body, a female member to be inserted into the mounting holes in the plate members and including a cylinder body for receiving the main body therein, a projecting portion formed on an outer periphery of the cylinder body at one end thereof and adapted to contact a periphery of one of the mounting holes of the plate members, and protruding portions formed on an inner peripheral portion of the cylinder body at a side away from the projecting portion, a first engaging portion formed on one of an outer surface of the main body and an inner surface of the cylinder body, said first engaging portion having a first engaging screw thread projecting in a direction away from the surface where the first engaging portion is formed, and a second engaging portion formed on the other of the outer surface of the main body and the inner surface of the cylinder body, and having second and third engaging screw threads and a smooth surface portion interposed therebetween, said second and third engaging screw threads projecting in a direction away from the surface where the second and third engaging screw threads are formed so that when the male member is inserted into the female member, the first engaging screw thread engages the second engaging screw thread, passes over the smooth surface without engagement therewith, and engages the third engaging screw thread.

2. A fastener according to claim 1, wherein said main body has a length such that when the first engaging screw thread engages the second engaging screw thread, the main body does not contact the protruding portions, but when the first engaging screw thread engages the third engaging screw thread, the main body contacts the protruding portions to push outwardly.

3. A fastener according to claim 2, wherein said first engaging screw thread is a female thread formed on a part of the inner surface of the cylinder body, and said second and third engaging screw threads are two male threads formed on the outer surface of the main body to be engageable with the female thread.

4. A fastener according to claim 3, wherein said cylinder body includes a plurality of slits extending at least from the protruding portions so that when the male member is fully inserted into the female member, the protruding portions extend outwardly.

* * * * *